TAPE TRANSPORT CONTROL
Filed Sept. 1, 1955
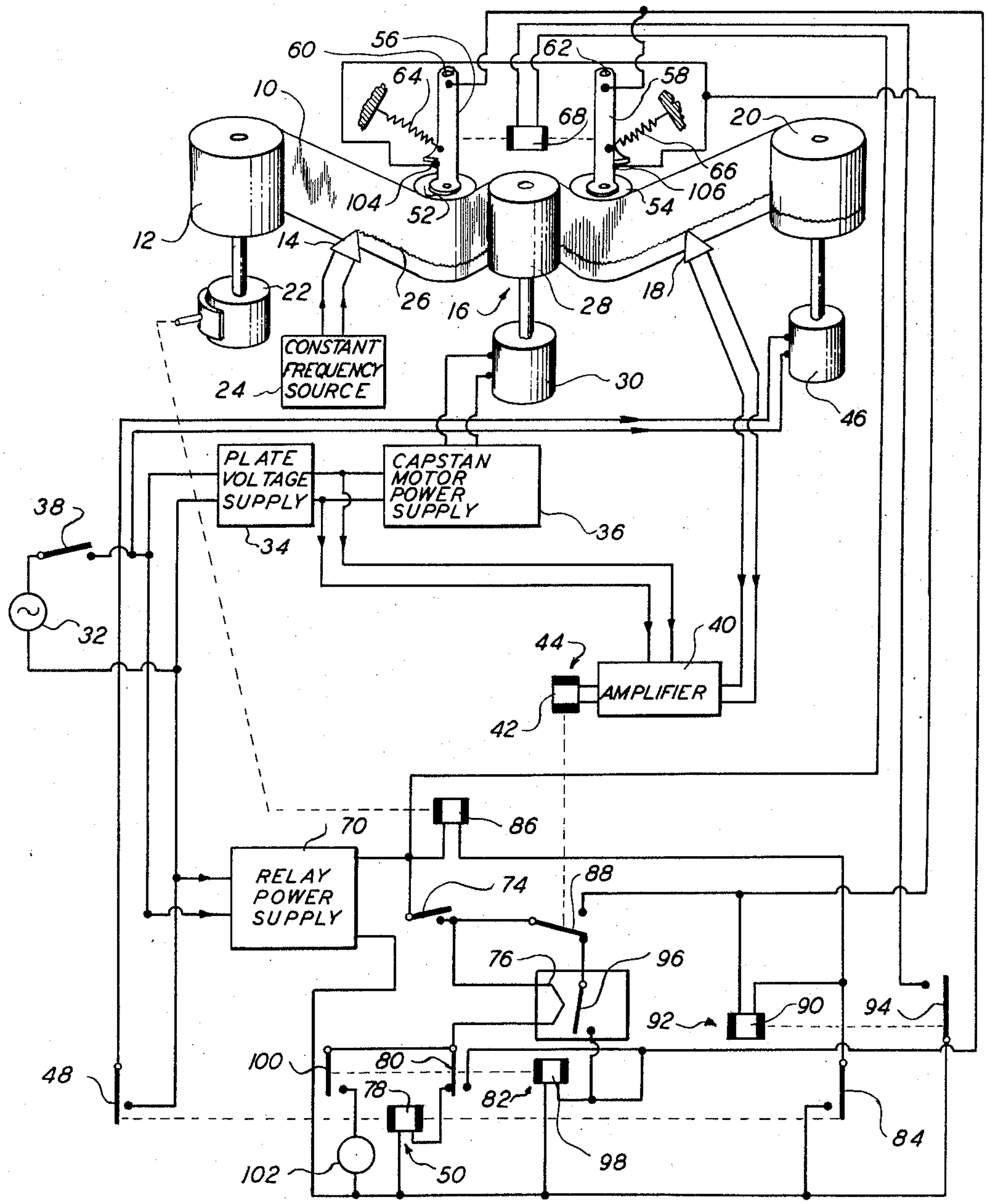
INVENTORS
ARVO A. LAHTI
GLENN D. MAXWELL
BY
Christie, Parker & Hale
ATTORNEYS United States Patent Office 2,909,337

Patented Oct. 20, 1959

2,909,337

TAPE TRANSPORT CONTROL

Arvo A. Lahti, Scottsdale, Ariz., and Glenn D. Maxwell, Arcadia, Calif., assignors, by mesne assignments, to Consolidated Electrodynamics Corporation, Pasadena, Calif., a corporation of California Application September 1, 1955, Serial No. 531,944

7 Claims. (Cl. 242—55.12)

This invention relates to controls for systems for transporting magnetic tape, such as in tape recorder apparatus and the like. The invention has particular reference to tape transport controls for engaging the tape with the primary tape drive mechanism after a secondary tape drive mechanism has brought the tape up to proper speed.

A conventional tape transport system normally includes a tape supply reel, braking means coupled to the tape supply reel, a cylindrical capstan drive member, a primary drive mechanism for rotating the capstan member at a substantially constant speed, tape engaging means for engaging the tape with the capstan member, a tape take-up reel, and a secondary drive mechanism for driving the take-up reel. In the conventional tape transport system, certain problems arise in starting. If the tape engaging means is engaged to couple the tape to the capstan before the reel system has brought the tape up to capstan speed, a slack loop develops in the tape on the take-up side of the capstan; and if the tape speed derived from the reel system has overshot the capstan speed before the tape engaging means is engaged, a slack loop develops on the tape supply side of the capstan. If left unattended, these slack loops are soon taken up. However, malfunctions in guiding often occur and undesirable stresses are set up in the tape, resulting in damaged and sometimes broken tape.

These difficulties are conventionally overcome by utilizing compliant elements such as spring-loaded arms or vacuum columns for handling the slack loops in the tape. While the compliant elements operate satisfactorily under some conditions, they involve additional equipment which unduly increases the weight and space occupied by the tape transport system. Further, when operated under conditions involving acceleration of the apparatus such as in airborne instrumentation, the compliant elements do not operate satisfactorily because they respond to acceleration.

The present invention solves the problem of slack loops developing in the tape by providing means responsive to tape speed for automatically engaging the tape to the primary tape drive system at the moment when the secondary tape drive system has brought the tape up to proper speed.

Another problem which arises in the conventional tape transport system is that of supplying warning and preventing spurious unreeling of tape in the event of a failure such as a tape breakage or mechanical malfunction in the tape transport system.

A preferred embodiment of the invention solves these problems by providing means responsive to tape transport failure for automatically disabling the tape transport system in the event of a failure so as to prevent spurious unreeling of tape, and means responsive to tape transport failure for supplying the desired failure warning signal in the event of a failure.

The invention is explained in detail with reference to the accompanying drawing which is a schematic representation of the preferred embodiment of the invention.

In a tape recorder for multiple data-channel recording, a timing or synchronizing reference signal is usually recorded in addition to the signals which carry the information which is to be reproduced. This is ordinarily accomplished by engaging the tape with a recording head which records the reference signal on the tape. If a reading head is provided on this track in a position following the recording head, a signal may be derived which is proportional to tape velocity. This signal may be used to energize a relay when the signal voltage (and therefore tape velocity) reaches a predetermined value. This relay may in turn actuate a pinch roll which presses the tape against the rotating capstan.

This relay will drop out if a transport failure such a tape breakage should occur, and, by including a set of contacts on the pinch roll mechanism, a logical network giving failure warning and automatically turning the transport off in the event of failure may be constructed.

Referring to the drawing, a tape transport system is shown wherein a magnetic tape 10 is removed from a supply reel 12, transported past a recording head 14, through a primary tape drive mechanism 16, past a reading head 18, and finally taken up by a take-up reel 20.

The supply reel is provided with a braking means 22. The recording head is energized by a constant frequency source 24 and it records a reference signal along a track 26 on the tape. The primary tape drive mechanism includes a cylindrical capstan drive member 28 rotated by a synchronous electric capstan motor 30, the capstan motor being powered from an alternating current source 32 through a plate voltage supply 34 and a capstan motor power supply 36. Power to the capstan motor is controlled by a manually operated switch 38, the closure of which starts the capstan drive member rotating.

The reading head 18 senses the reference signal on the tape and applies it through an amplifier 40 to the winding 42 of a signal relay 44, the amplifier receiving its power from the plate voltage supply 34. The take-up reel 20 is driven by a small free-running reel motor 46 which takes power directly from the alternating current supply 32 through the manually operated switch 38 and through the contacts 48 of a record relay 50. The take-up reel and reel motor may be termed a secondary tape drive mechanism, although conventionally its primary function is merely to take up the tape which is metered by the capstan.

A pair of pinch rollers 52, 54 are rotatably mounted on arms 56, 58 respectively, with each of the arms being pivoted at one end as shown at 60, 62. A pair of springs 64, 66 each connected to a respective arm urge the arms about their pivot points so that the pinch rollers are held away from the capstan member. An actuator solenoid 68 may be energized to cause the arms to pivot against the action of the respective springs and press the pinch rollers against the capstan member, thus engaging the tape with the capstan. Taken collectively, the pinch rollers and associated structure may be termed a tape engaging means.

A relay power supply 70 receives power from the alternating current supply 32 by closure of the manually operated power switch 38, and it supplies power to the windings of all of the relays except the relay 44. A manually operated record switch 74 energizes a heating element 76, and it also energizes the winding 78 of the record relay 50 through the armature 80 and the associated back contact of a failure relay 82. Energization of the record relay winding 78 closes the record relay contacts 48 which start the reel motor 46, and further closes the record relay contacts 84 causing the relay power supply to energize a brake solenoid 86 which releases the braking means 22 on the supply reel.

When the reel system has brought the tape up to capstan speed, the signal voltage produced at the reading head will be sufficient to energize the signal relay winding 42. Energization of the signal relay winding causes the armature 88 of the signal relay to engage the associated front contact which in turn provides a circuit which permits the relay power supply 70 to energize the winding 90 of an engage relay 92. The armature 94 of the engage relay engages its associated contact to close a circuit which permits the relay power supply to energize the actuator solenoid 68. Alternatively, the engage relay could be omitted and the actuator solenoid could be connected between the front contact associated with the armature 88 and the armature 84, thereby being energized directly when the signal relay is energized.

The heater element 76 serves to close a normally open thermal switch 96 after a predetermined time interval, the measure of time beginning when the manual record switch 74 is closed and the element begins to heat, with the time interval corresponding to a time greater than that required for the reference signal which is recorded on the tape to pass from the recording head to the reading head. Closure of the thermal switch while the armature 88 is in its back or unactuated position causes the relay power supply to energize the winding 98 of the relay 82 which actuates the armature 80 to its front contact, cutting off the power to the record relay 50 and thereby cutting off power to the reel motor and applying the brakes on the supply reel. Further, the energization of the failure relay actuates an armature 100 which connects the relay power supply across a failure warning device 102. The failure warning device may be a light, a bell or other signaling device as desired. Thus, the failure relay acts as a disabling means for shutting off the tape transport when a failure occurs.

If the armature 88 has already been actuated to its front position, then the closure of the thermal switch does not actuate the failure relay. Thus, the thermal switch is a time delay switch and gives the tape transport system a predetermined amount of time to come up to speed and engage with the capstan. If this does not occur within the predetermined time interval as might be occasioned if the recording head failed to record or if the tape broke during starting, the thermal switch causes the failure relay to actuate the failure warning device and to shut off the record relay 50, thus disabling the transport system by turning off the reel motor and by allowing the brakes on the supply reel to engage.

If there is no failure during the starting process, then the thermal switch remains closed as long as the heating element 76 continues to heat. If, for any reason, the signal relay 44 is de-energized such as might occur if the tape broke so as to cut off the signal picked up by the reading head 18, the armature 88 is released to its back position, thus closing the circuit through the thermal switch to the failure relay 82 and thereby shutting off the system and providing a failure warning.

A pair of electrical contacts 104, 106 are positioned to be contacted by the arms carrying the pinch rolls when they are in their disengaged position. If either or both of the pinch roll arms fail to be actuated by the actuator solenoid 68 when the engagement relay 92 is energized through the armature 88 by the relay power supply, either or both of these contacts 104, 106 will receive power through the armature 88 and close a circuit to the failure relay 82. As can be seen in the drawing, the pinch roll arms 56, 58 are shaped so that they will always be touching the contacts 104, 106 except when the pinch rolls are firmly engaged against the capstan.

The signal relay 44 should be a slow releasing type to minimize spurious error warning. Further, the failure relay 82 should be a slow operating relay to prevent spurious error warning while the pinch rolls are closing.

It will be apparent that a time delay relay may be employed instead of the thermal switching arrangement 76 and 96, if desired.

We claim:

1. In apparatus for transporting magnetic tape having primary tape-drive means, control means for engaging and disengaging the primary tape-drive means, and secondary tape-drive means, the improvement which comprises means for causing the control means to disengage the primary tape-drive means so that the tape is driven by the secondary tape-drive means until it attains a predetermined speed, means for providing an electrical signal representative of the tape speed, and electrical switching means responsive to the electrical signal for causing the control means to engage the primary tape-drive means when the tape attains a predetermined speed.

2. In apparatus for transporting magnetic tape having tape supply means, primary tape-drive means for driving the tape, control means for engaging and disengaging the tape with the primary tape-drive means, and secondary tape-drive means for taking up the tape, the improvement which comprises means for causing the control means to disengage the tape from the primary tape-drive means so that the tape is driven by the secondary tape-drive means until it attains a predetermined speed, means for providing an electrical signal representative of the tape speed, and electrical switching means responsive to the electrical signal for causing the control means to engage the tape with the primary tape-drive means when the tape attains a predetermined speed and for causing the control means to disengage the tape from the primary tape-drive means when the speed of the tape is less than a predetermined value.

3. In apparatus for transporting magnetic tape including tape supply means, primary tape-drive means for driving the tape, tape engagement means for engaging the tape with the primary tape-drive means, secondary tape-drive means for taking up the tape, and means for providing an electrical signal representative of tape speed, the improvement which comprises electrical switching means responsive to the electrical signal for actuating the tape engagement means when the tape reaches a predetermined speed derived from the secondary tape-drive means during starting of the tape transport, the electrical switching means also being responsive to the electrical signal for de-actuating the tape engagement means and thereby disengaging the tape with the primary tape-drive means when the electrical signal is less than a predetermined value, means for disabling the tape transport, and a time-delay switch responsive to non-actuation of the electrical switching means for a predetermined time during starting for actuating the disabling means and thereby shutting off the tape transport.

4. In apparatus for transporting magnetic tape including tape supply means, a primary tape-drive means for driving the tape, tape engagement means for engaging the tape with the primary tape-drive means, secondary tape-drive means for taking up the tape, and means for providing an electrical signal representative of tape speed, the improvement which comprises electrical switching means responsive to being actuated by a predetermined value of the electrical signal for actuating the tape engagement means when the tape reaches a predetermined speed derived from the secondary tape-drive means during starting of the tape transport, the electrical switching means also being responsive to the electrical signal for de-actuating the tape engagement means and thereby disengaging the tape with the primary tape-drive means when the electrical signal falls below a predetermined value, disabling means for shutting off the tape transport, and electrical means responsive to erroneous disengagement of the tape engagement means while the switching means is still actuated for energizing the disabling means and thereby shutting off the tape transport.

5. In apparatus for transporting magnetic tape including tape supply means, primary tape-drive means for driving the tape, tape engagement means for engaging the tape with the primary tape drive means, secondary tape-drive means for taking up the tape, and means for providing an electrical signal representative of tape speed, the improvement which comprises electrical switching means responsive to a predetermined value of the electrical signal for actuating the tape engagement means when the tape reaches a predetermined speed from the secondary tape-drive means during starting of the tape transport, the electrical switching means also being responsive to the electrical signal for de-actuating the tape engagement means and thereby disengaging the tape with the primary tape-drive means when the electrical signal falls below a predetermined value, and disabling means responsive to the electrical switching means for shutting off the tape transport when the electrical signal falls below a predetermined value.

6. In apparatus for transporting magnetic tape including tape supply means, primary tape-drive means for driving the tape at a substantially constant speed, tape engagement means for engaging the tape with the primary tape-drive means, secondary tape-drive means for taking up the tape, and means for providing an electrical signal representative of tape speed, the improvement which comprises electrical switching means responsive to a predetermined value of the electrical signal for causing the tape engagement means to engage the tape with the primary tape-drive means when the tape reaches a predetermined speed derived from the secondary tape-drive means during starting of the tape transport, the electrical switching means also being responsive to the electrical signal for de-actuating the tape engagement means and thereby disengaging the tape with the primary tape-drive means when the electrical signal falls below a predetermined value, disabling means for shutting off the tape transport, a time-delay switch responsive to non-actuation of the electrical switching means for a predetermined time during starting for actuating the disabling means and thereby shutting off tape transport, the disabling means being responsive to the electrical switching means for shutting off the tape transport when the electrical signal falls below a predetermined value, electrical means responsive to erroneous disengagement of the tape engagement means while the switching means is still actuated for actuating the disabling means and thereby shutting off the tape transport, and failure warning means responsive to actuation of the disabling means for providing a warning-signal indication of tape transport failure.

7. In a magnetic tape transport system which includes a tape supply reel, braking means coupled to the tape supply reel, a cylindrical capstan drive member, a primary drive mechanism for rotating the capstan at a substantially constant speed, tape engaging means for engaging the tape with the capstan, a reading head for sensing a reference signal on the tape and producing a voltage therefrom representative of tape speed, a take-up reel for taking up the tape and a secondary drive mechanism for driving the take-up reel, the improvement which comprises electrical switching means responsive to a predetermined value of the electrical signal for actuating the tape engagement means when the tape reaches a predetermined speed from the take-up reel during starting of the tape transport, the electrical switching means also being responsive to the electrical signal for de-actuating the tape engagement means and thereby disengaging the tape with the capstan when the electrical signal falls below a predetermined value, disabling means coupled to the braking means and to the secondary drive mechanism for shutting off the tape transport by causing the braking means to engage and by shutting off the secondary drive mechanism, a time-delay switch coupled to the disabling means and responsive to non-actuation of the electrical switching means for a predetermined time during starting for actuating the disabling means, the disabling means being coupled to the electrical switching means for shutting off the tape transport when the electrical signal falls below a predetermined value, electrical means coupled to the disabling means and responsive to erroneous disengagement of the tape engagement means while the switching means is still actuated for actuating the disabling means and thereby shutting off the tape transport, and failure warning means coupled to the disabling means and responsive to actuation of the disabling means for providing a warning signal indication of tape transport failure.

References Cited in the file of this patent

UNITED STATES PATENTS

| | | |
|---|---|---|
| 2,396,409 | Berzer | Mar. 12, 1946 |
| 2,496,103 | Neufeld | Jan. 31, 1950 |
| 2,514,578 | Heller et al. | July 11, 1950 |
| 2,519,567 | Handschin | Aug. 22, 1950 |
| 2,643,071 | Williams | June 23, 1953 |
| 2,676,513 | Engstrom | Apr. 27, 1954 |
| 2,726,048 | Crain | Dec. 6, 1955 |
| 2,733,871 | Reinhold | Feb. 7, 1956 |
| 2,778,634 | Gams et al. | Jan. 22, 1957 |